United States Patent
Akami et al.

(10) Patent No.: US 12,545,348 B2
(45) Date of Patent: Feb. 10, 2026

(54) STRADDLE TYPE VEHICLE, METHOD FOR CONTROLLING THE SAME, CONTROL APPARATUS, AND STORAGE MEDIUM

(71) Applicant: HONDA MOTOR CO., LTD., Tokyo (JP)

(72) Inventors: Kazuki Akami, Tokyo (JP); Satoru Kamijo, Tokyo (JP); Hiromi Suzuki, Tokyo (JP); Takashi Doi, Tokyo (JP); Daiki Kodaira, Tokyo (JP); Satoshi Ochiai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 120 days.

(21) Appl. No.: 18/226,878

(22) Filed: Jul. 27, 2023

(65) Prior Publication Data

US 2023/0365212 A1 Nov. 16, 2023

Related U.S. Application Data

(63) Continuation of application No. PCT/JP2021/004121, filed on Feb. 4, 2021.

(51) Int. Cl.
*B62J 27/00* (2020.01)
*B62J 45/20* (2020.01)
*B62J 50/22* (2020.01)

(52) U.S. Cl.
CPC ............... *B62J 27/00* (2013.01); *B62J 45/20* (2020.02); *B62J 50/22* (2020.02)

(58) Field of Classification Search
CPC ... B62J 27/00; B62J 45/20; B62J 50/22; B62J 45/41; B60K 2360/168; B60K 2360/179;
(Continued)

(56) References Cited

U.S. PATENT DOCUMENTS 8,626,431 B2    1/2014    Okita
10,688,990 B2    6/2020    Kim
(Continued)

FOREIGN PATENT DOCUMENTS

CN          112141096 A    12/2020
DE    102008010549 A1    11/2010
(Continued)

OTHER PUBLICATIONS

Japanese Office Action for Japanese Patent Application No. 2022579242 mailed May 20, 2024 (partially translated).
(Continued)

*Primary Examiner* — Alan D Hutchinson
(74) *Attorney, Agent, or Firm* — Thomas Horstemeyer, LLP

(57) ABSTRACT

A straddle type vehicle includes a front detection unit configured to detect an object in front of a self-vehicle, a first determination unit configured to determine whether there is an avoidance space for avoiding contact with the object by turning in a case where there is a possibility of contact of the self-vehicle with the object, and a notification unit configured to give notification of information regarding the avoidance space in a case where the first determination unit determines that there is the avoidance space. The notification unit gives notification of information, as the information regarding the avoidance space, indicating that it is possible to avoid contact with the object by turning in a travel lane in which the self-vehicle is traveling.

14 Claims, 11 Drawing Sheets

(58) Field of Classification Search
CPC ............ B60K 2360/1868; B60K 35/22; B60K 35/28; B60Y 2300/18166; B62K 21/00; G08G 1/16
See application file for complete search history.

(56) References Cited

U.S. PATENT DOCUMENTS

| | | | |
|---|---|---|---|
| 11,370,489 | B2 | 6/2022 | Jang et al. |
| 11,697,466 | B1 | 7/2023 | Shelton |
| 2014/0275891 | A1 | 9/2014 | Muehlemann et al. |
| 2014/0276013 | A1 | 9/2014 | Muehlemann et al. |
| 2014/0276014 | A1 | 9/2014 | Khanicheh et al. |
| 2019/0276013 | A1 | 9/2019 | Kim |
| 2021/0009117 | A1* | 1/2021 | Emura .................. B60Q 5/006 |
| 2021/0015365 | A1 | 1/2021 | Muehlemann et al. |
| 2022/0340166 | A1* | 10/2022 | Kume .................. G08G 1/0133 |

FOREIGN PATENT DOCUMENTS

| | | |
|---|---|---|
| JP | 2010-018207 A | 1/2010 |
| JP | 2011-051571 A | 3/2011 |
| JP | 2015-011458 A | 1/2015 |
| JP | 2016-037266 A | 3/2016 |
| JP | 2018-167732 A | 11/2018 |
| JP | 2019-121071 A | 7/2019 |
| JP | 2021-183444 A | 12/2021 |
| WO | 2017/0030130 A1 | 2/2017 |
| WO | 2021/235043 A1 | 11/2021 |
| WO | 2022/168236 A1 | 8/2022 |

OTHER PUBLICATIONS

International Search Report for PCT/JP2021/004121 mailed Apr. 20, 2021 with partial English Translation.
IPRP for PCT/JP2021/004121 mailed Oct. 19, 2021.
Chinese Office Action for Chinese Patent Application No. 202180092181.3 mailed Oct. 13, 2025.
Office Action for Indian Patent Application No. 202317051747 dated Nov. 12, 2025.

* cited by examiner

STRADDLE TYPE VEHICLE, METHOD FOR CONTROLLING THE SAME, CONTROL APPARATUS, AND STORAGE MEDIUM

CROSS-REFERENCE TO RELATED APPLICATION(S)

This application is a continuation of International Patent Application No. PCT/JP2021/004121, filed on Feb. 4, 2021, the entire disclosures of which is incorporated herein by reference.

BACKGROUND OF THE INVENTION

Field of the Invention

The present invention relates to a straddle type vehicle, a method for controlling the same, a control apparatus, and a storage medium.

Description of the Related Art

As driving assistance technology for a vehicle, technology of giving notification when there is a possibility of contact with a preceding vehicle is known. For example, Japanese Patent Laid-Open No. 2015-011458 discloses displaying an image regarding lane changing when it is determined that a self-vehicle will catch up with a preceding vehicle.

Braking and turning are conceivable as means for avoiding contact with an object in front. Since the straddle type vehicle is narrower in vehicle width than the four-wheeled vehicle and can pass by a space narrower than the four-wheeled vehicle, there is a case where avoidance by turning can be easily performed. On the other hand, since the rider needs to determine whether to avoid the object in front by braking or to avoid the object in front by turning in a short time, it is desirable to notify the rider of information for determining whether to turn.

SUMMARY OF THE INVENTION

An object of the present invention is to provide technology for notifying a rider of information for avoidance by turning.

According to an aspect of the present invention, there is provided a straddle type vehicle comprising:
  a front detection unit configured to detect an object in front of a self-vehicle;
  a first determination unit configured to determine whether there is an avoidance space for avoiding contact with the object by turning in a case where there is a possibility of contact of the self-vehicle with the object; and
  a notification unit configured to give notification of information regarding the avoidance space in a case where the first determination unit determines that there is the avoidance space,
  wherein the notification unit gives notification of information, as the information regarding the avoidance space, indicating that it is possible to avoid contact with the object by turning in a travel lane in which the self-vehicle is traveling.

Further features of the present invention will become apparent from the following description of exemplary embodiments (with reference to the attached drawings).

DESCRIPTION OF THE EMBODIMENTS

Figure 1:
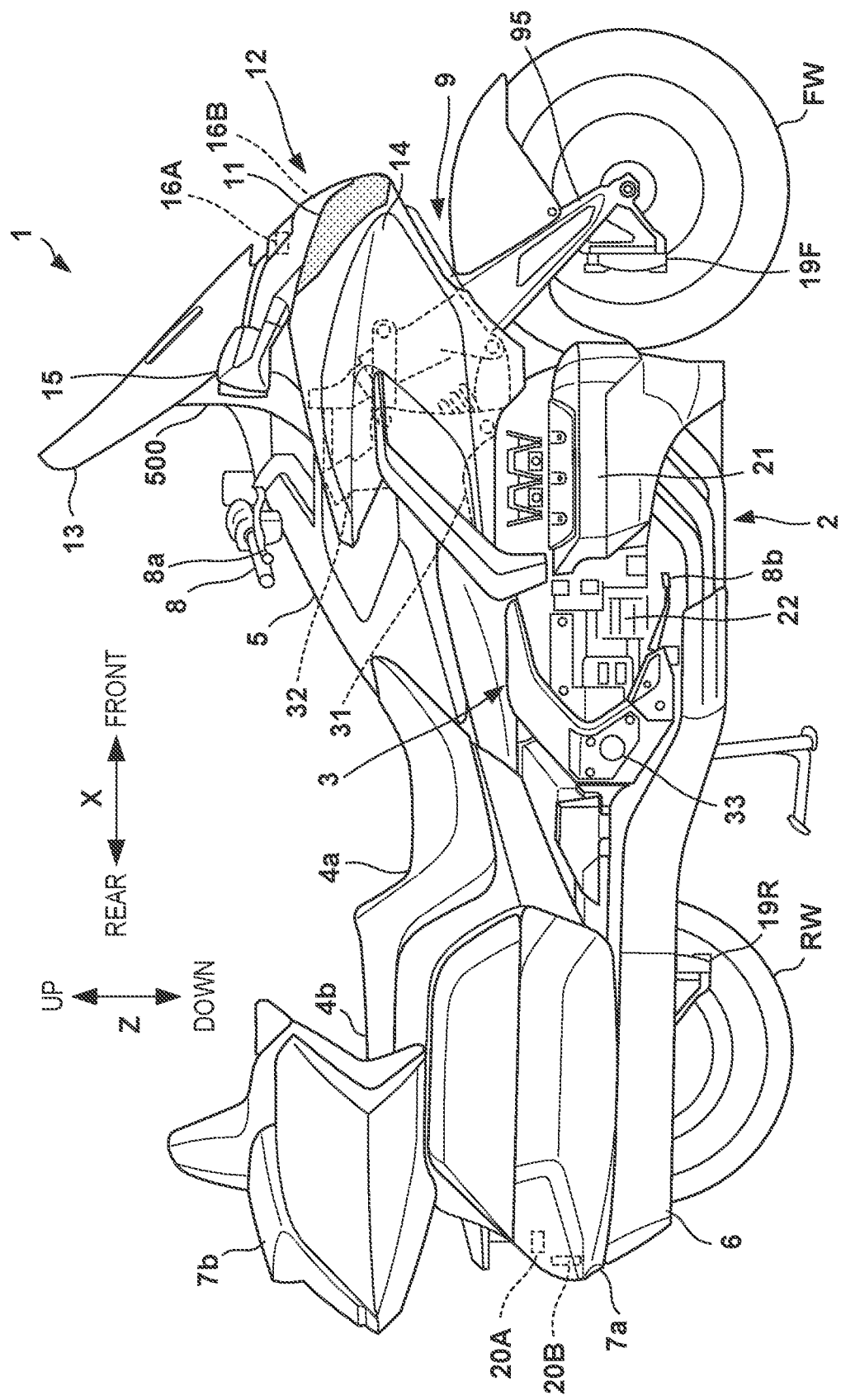
FIG. 1 is a right-side view of a straddle type vehicle according to an embodiment.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

In the drawings, arrows X, Y, and Z indicate directions orthogonal to one another, an X direction indicates a front-and-rear direction of a straddle type vehicle, a Y direction indicates a vehicle width direction (left-and-right direction) of the straddle type vehicle, and a Z direction indicates an up-and-down direction. The left and right of the straddle type vehicle are left and right, respectively, when viewed in a forward movement direction. Hereinafter, a front side or a rear side in the front-and-rear direction of the straddle type vehicle may be simply referred to as the front side or the rear side. In addition, an inner side or an outer side in the vehicle width direction (left-and-right direction) of the straddle type vehicle may be simply referred to as the inner side or the outer side.

First Embodiment

<Outline of Straddle Type Vehicle>

Figure 2:
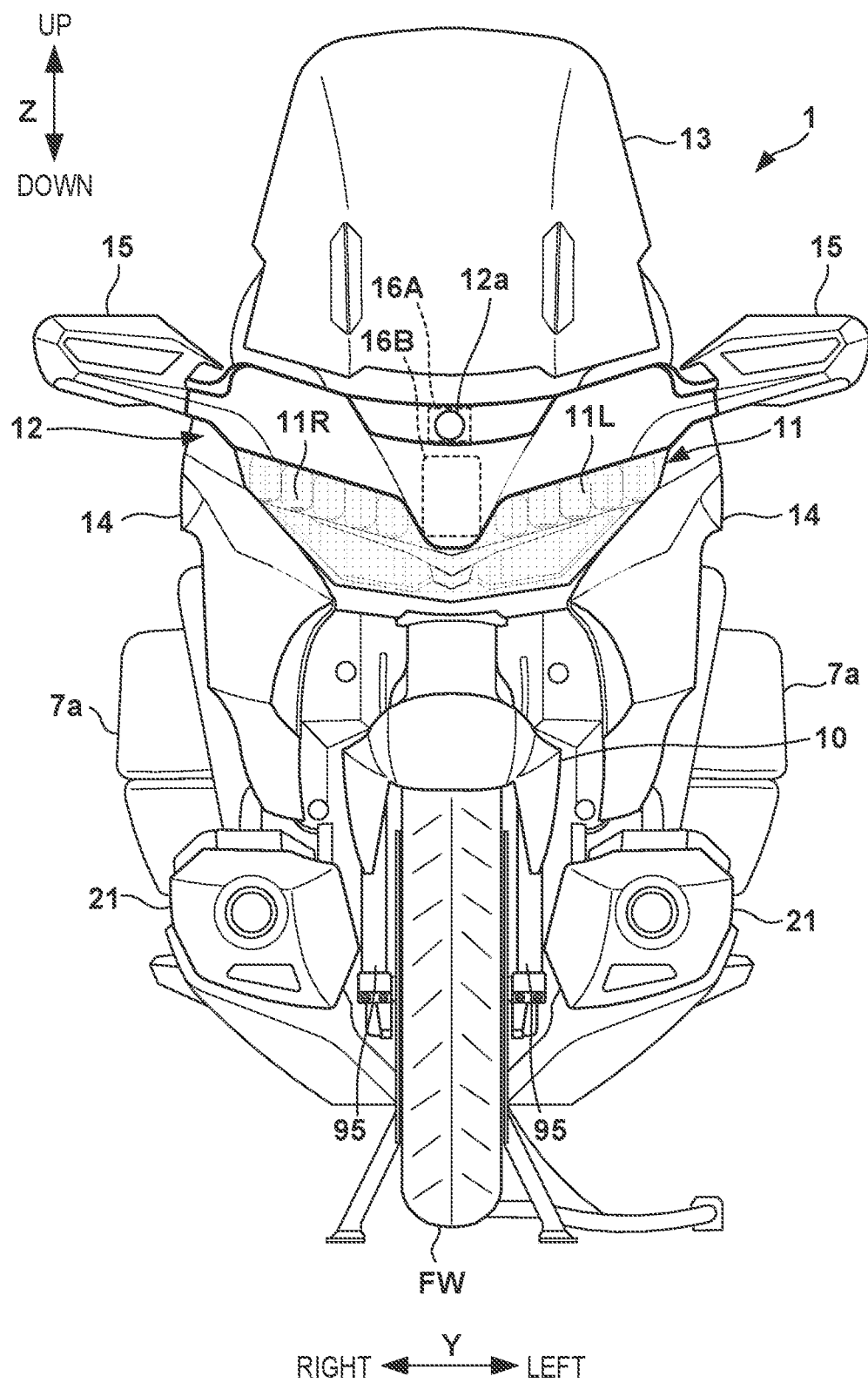
FIG. 2 is a front view of the straddle type vehicle of FIG. 1.

FIG. 1 is a right-side view of a straddle type vehicle 1 according to an embodiment of the present invention, and FIG. 2 is a front view of the straddle type vehicle 1 of FIG. 1.

The straddle type vehicle 1 is a tourer motorcycle suitable for a long-distance movement, but the present invention is applicable to various straddle type vehicles including other types of motorcycles and is also applicable to an electric vehicle using a motor as a drive source in addition to a vehicle using an internal combustion engine as a drive source. Hereinafter, the straddle type vehicle 1 may be referred to as the vehicle 1.

The vehicle 1 includes a power unit 2 between a front wheel FW and a rear wheel RW. In the case of the present embodiment, the power unit 2 includes a horizontally opposed six-cylinder engine 21 and a transmission 22. The driving force of the transmission 22 is transmitted to the rear wheel RW through a drive shaft, which is not illustrated, to rotate the rear wheel RW.

The power unit 2 is supported by a vehicle body frame 3. The vehicle body frame 3 includes a pair of left and right main frames 31 extending in the X direction. A fuel tank 5 and an air cleaner box (not illustrated) are disposed above the main frames 31. In front of the fuel tank 5, a meter panel 500 including an electronic image display apparatus or the like that displays various information to a rider is provided.

Figure 3:
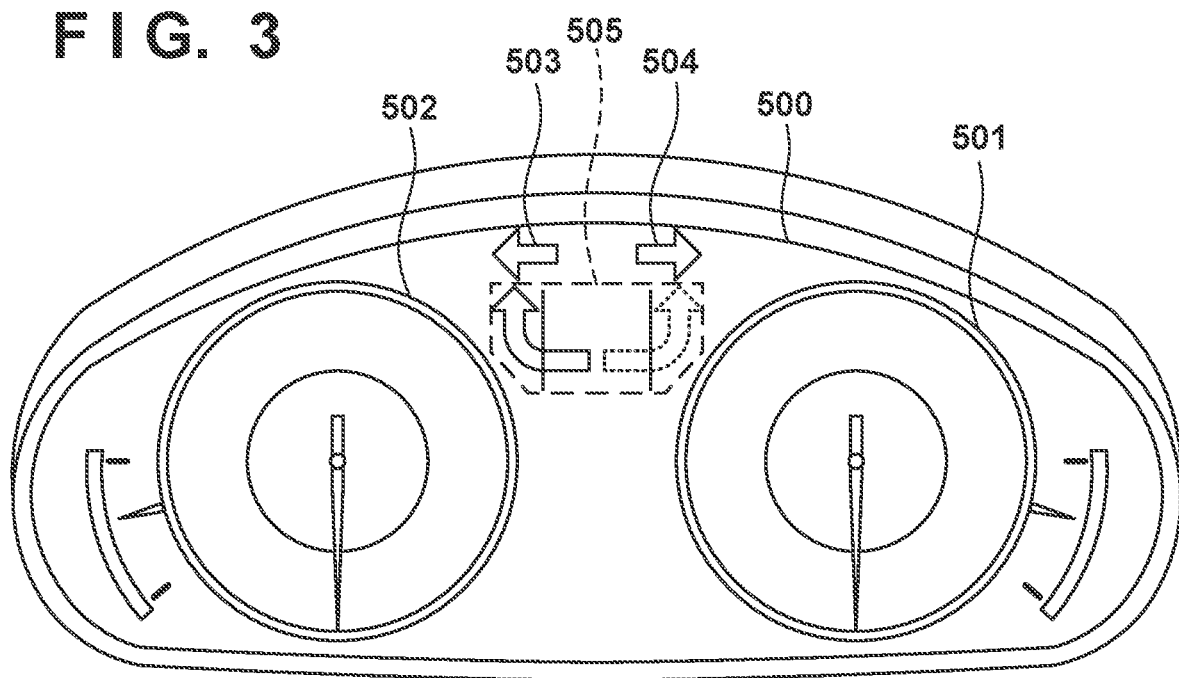
FIG. 3 is a view illustrating a configuration example of a meter panel.

FIG. 3 is a view illustrating a configuration example of the meter panel 500. Various information is displayed on the meter panel 500. In the present embodiment, the meter panel 500 displays a speedometer 501, a tachometer 502, and indicators 503 and 504 indicating indication directions of direction indicators. Additionally, the meter panel 500 may display a fuel gauge, a water temperature gauge, or the like. Note that the entire meter panel 500 may be configured by a display unit such as a liquid crystal display or an organic EL display, or may be a combination of an analog meter and the display unit. In addition, the meter panel 500 includes a notification area 505 for notifying the rider of information regarding the avoidance space in front by processing to be described below. In the present embodiment, the notification area 505 is provided at a center portion of the meter panel 500 where the rider can easily visually recognize, specifically, between the speedometer 501 and the tachometer 502, and below the indicators 503 and 504.

The description returns to FIGS. 1 and 2. A head pipe 32, which rotatably supports a steering shaft (not illustrated) rotated by a handlebar 8, is provided at a front-side end portion of the main frames 31. A pair of left and right pivot plates 33 is provided at rear end portions of the main frames 31. Lower end portions of the pivot plates 33 and front end portions of the main frames 31 are connected by a pair of left and right lower arms (not illustrated), and the power unit 2 is supported by the main frames 31 and the lower arms. At the rear end portions of the main frames 31, a pair of left and right seat rails (not illustrated) extending rearward is also provided, and the seat rails support a seat 4a on which the rider is seated, a seat 4b on which a passenger is seated, a rear trunk 7b, and the like.

A front end portion of a rear swing arm (not illustrated) extending in the front-and-rear direction is swingably supported by the pivot plates 33. The rear swing arm is swingable in the up-and-down direction, and the rear wheel RW is supported at a rear end portion thereof. An exhaust muffler 6 that muffles exhaust of the engine 21 extends in the X direction on a lower lateral side of the rear wheel RW. Left and right saddle backs 7a are provided on upper lateral sides of the rear wheel RW.

At the front end portions of the main frames 31, a front suspension mechanism 9 that supports the front wheel FW is formed. The front wheel FW is rotatably supported by front forks 95 of the front suspension mechanism 9. A steering shaft of the front suspension mechanism 9 is rotated by steering of the handlebar 8, and the front wheel FW is steered.

The vehicle 1 includes a brake apparatus 19F that applies brake to the front wheel FW and a brake apparatus 19R that applies brake to the rear wheel RW. The brake apparatuses 19F and 19R are configured to be capable of being actuated by an operation of the rider on a brake lever 8a or a brake pedal 8b. The brake apparatuses 19F and 19R are, for example, disc brakes. In a case where the brake apparatuses 19F and 19R are not distinguished from each other, they will be collectively referred to as the brake apparatus 19.

In a front portion of the vehicle 1, a headlight unit 11 that emits light ahead of the vehicle 1 is disposed. The headlight unit 11 according to the present embodiment is a headlight unit of a binocular type including symmetrically a right light emission unit 11R and a left light emission unit 11L. However, a headlight unit of a monocular type or a trinocular type, or a headlight unit of an asymmetrical binocular type can also be adopted.

The front portion of the vehicle 1 is covered with a front cowl 12, and front-side side portions of the vehicle 1 are covered with a pair of left and right side cowls 14. A screen 13 is disposed above the front cowl 12. The screen 13 is a windshield that reduces wind pressure that the rider receives during traveling and is formed of, for example, a transparent resin member.

A pair of left and right side mirror units 15 is disposed on lateral sides of the front cowl 12. On the side mirror units 15, side mirrors (not illustrated) for the rider to visually recognize the rear side are supported.

An imaging unit 16A and a radar 16B, which are detection devices that detect a situation ahead of the vehicle 1, are disposed behind the front cowl 12. The radar 16B is, for example, a millimeter wave radar. The imaging unit 16A includes an imaging element such as a CCD image sensor or a CMOS image sensor and an optical system such as a lens, and captures an image ahead of the vehicle 1. The imaging unit 16A is disposed behind an upper portion of the front cowl 12. In the front cowl 12, an opening 12a penetrating therethrough is formed, and the imaging unit 16A captures an image ahead of the vehicle 1 through the opening 12a. Note that the disposition of the imaging unit 16A and the radar 16B is an example. The imaging unit 16A and the radar 16B may be disposed at other positions such as under the bottom or inside the headlight unit 11.

The radar 16B is disposed behind the front cowl 12. Due to the presence of the front cowl 12, the presence of the detection unit 16 can be made inconspicuous in a front view of the vehicle 1, and deterioration in appearance of the vehicle 1 can be avoided. A portion of the front cowl 12 located in front of the radar 16B is made of a material capable of transmitting electromagnetic waves, such as resin.

The imaging unit 16A and the radar 16B are disposed at a center portion of the front cowl 12 in the Y direction in a vehicle front view. By disposing the imaging unit 16A and the radar 16B at a center portion of the vehicle 1 in the Y direction, a wider imaging range and detection range can be obtained on the left and right ahead of the vehicle 1, and any situation ahead of the vehicle 1 is detectable without being overlooked. In addition, one imaging unit 16A and one radar 16B can evenly monitor the left and right ahead of the vehicle 1, and therefore, it is particularly advantageous in the configuration of providing one imaging unit 16A and one radar 16B instead of providing a plurality of the imaging units 16A and a plurality of the radar 16B.

An imaging unit 20A and a radar 20B, which are detection devices that detect a situation behind the vehicle 1, are disposed at a rear portion of the vehicle 1. The imaging unit 20A may have the same configuration as the imaging unit 16A, and the radar 20B may have the same configuration as the radar 16B.

<Control Apparatus>

Figure 4:
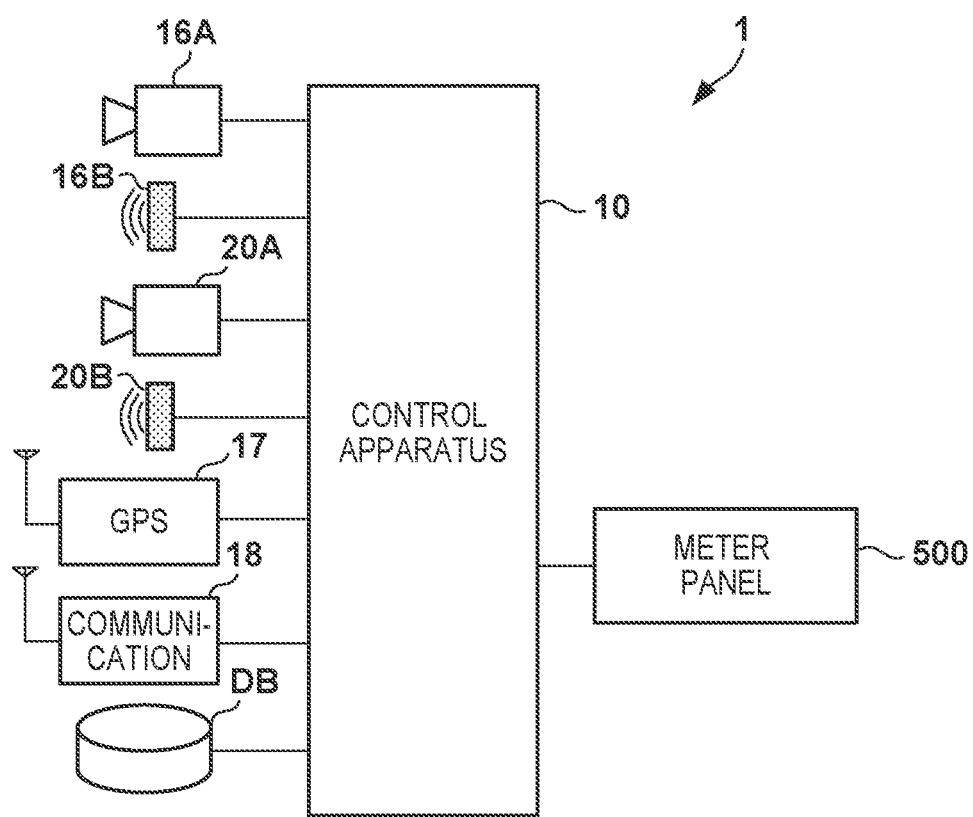
FIG. 4 is a block diagram illustrating a configuration example of hardware of the straddle type vehicle.

FIG. 4 is a block diagram illustrating a configuration example of hardware of the vehicle 1, and mainly illustrates a necessary configuration in relation to the description to be described below. The vehicle 1 includes a control apparatus 10. The control apparatus 10 includes, for example, an ECU. The control apparatus 10 includes a processor represented by a CPU, a storage device such as semiconductor memory, an input/output interface or a communication interface with an external device, or the like. The storage device stores programs executed by the processor, data used by the processor for processing, and the like. The control apparatus 10 may include a plurality of sets of processors, storage devices, interfaces, and the like corresponding to the functions of the vehicle 1. In addition, at least some functions of the control apparatus 10 may be achieved by a known semiconductor apparatus such as a programmable logic device (PLD) and an application-specific semiconductor integrated circuit (ASIC).

The control apparatus 10 acquires detection results of the imaging unit 16A and the radar 16B, and the imaging unit 20A and the radar 20B, and constantly recognizes a target and a road condition around the vehicle 1. In addition, the control apparatus 10 acquires information from a GPS sensor 17, a communication apparatus 18, and a map information database DB. The GPS sensor 17 detects the current position of the vehicle 1. The communication apparatus 18 performs wireless communication with a server that provides map information and traffic information, and acquires these pieces of information. The communication apparatus 18 may also be used for inter-vehicle communication and road-to-vehicle communication, and can acquire information of other vehicles, for example. The map information database DB can store highly accurate map information, and the control apparatus 10 can specify the form of a road on which the vehicle is traveling and the position of the vehicle 1 in a lane with higher accuracy on the basis of the map information and the like.

The control apparatus 10 can control display of the meter panel 500. In the present embodiment, the control apparatus 10 performs various notification displays for the rider on the meter panel 500. For example, the control apparatus 10 displays notification for avoiding contact between the self-vehicle and an object in front on the meter panel 500. In the present embodiment, the notification for avoiding contact is display of an image on the meter panel 500, but the notification may be display of an image on a head-up display or an in-vehicle display provided in the vehicle 1. In addition, the notification for avoiding contact may be notification by lighting or blinking of a lamp or by voice. The notification by voice may be controlled so that a voice is output from a speaker provided in the helmet of the rider by wireless communication. In addition, the notification by the meter panel 500 or the like and these notifications may be combined.

<Avoidance of Contact with Object in Front>

In a case where there is an object in front with which there is a possibility of collision during traveling, the rider riding on the vehicle 1 needs to take an avoidance action for avoiding contact with the object. As the avoidance action, an avoidance action by braking and an avoidance action by turning are conceivable. Depending on the positional relationship between the object in front and the vehicle 1, avoidance by turning may be more suitable. On the other hand, when the rider determines to perform avoidance by turning, it is necessary for the rider to determine, for example, whether there is a space at an avoidance destination in a short time, but such information may be insufficient.

Figure 5:
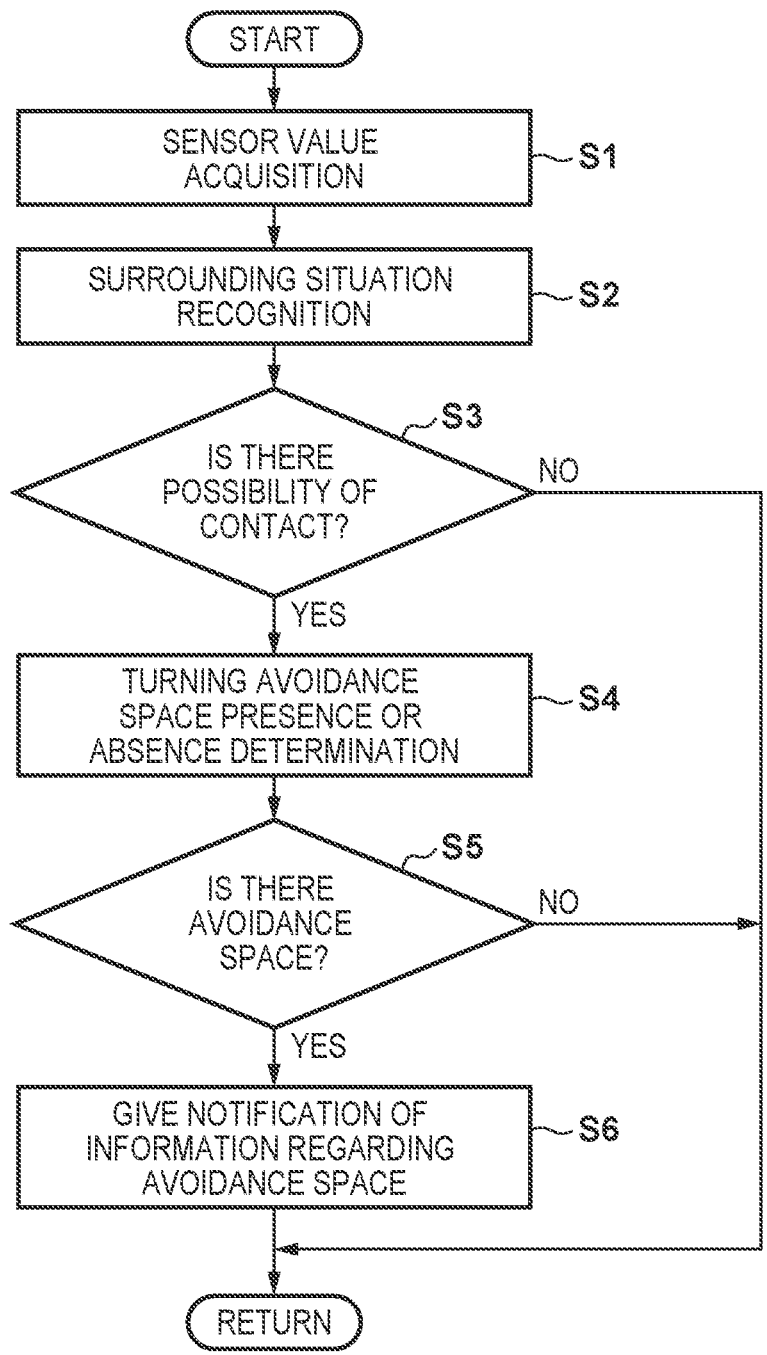
FIG. 5 is a flowchart regarding processing of notification for avoiding contact with an object in front executed by a control apparatus.

Therefore, in the present embodiment, when there is a possibility of collision with an object in front, notification is displayed on the meter panel 500 to provide the rider with information regarding the avoidance space. The processing content will be described below. FIG. 5 is a flowchart regarding processing of notification for avoiding contact with an object in front executed by the control apparatus 10. Each process described below is achieved when the processor reads and executes the program stored in the storage device in the control apparatus 10. Note that, in the example described below, a case of left-hand traffic is assumed as a traffic rule of vehicles on a road. In addition, each process described below is periodically and repeatedly executed by the control apparatus 10.

In addition, in the present embodiment, the avoidance by turning includes avoidance of contact with an object in front involving movement of the vehicle 1 in the width direction. Specifically, the avoidance by turning includes moving to a space on a lateral side of the object in front through an operation such as steering of the handlebar 8 by the rider or tilting of the vehicle body of the vehicle 1 by the rider.

In step S1 (hereinafter, it is simply referred to as S1, and the same applies to the other steps), the control apparatus 10 acquires sensor values of various sensors. In the present embodiment, the control apparatus 10 acquires detection results of the imaging unit 16A and the radar 16B as sensor values of various sensors. Note that the control apparatus 10 may acquire information from the GPS sensor 17 or the communication apparatus 18.

In S2, the control apparatus 10 recognizes the surrounding situation of the self-vehicle.

Figure 6:
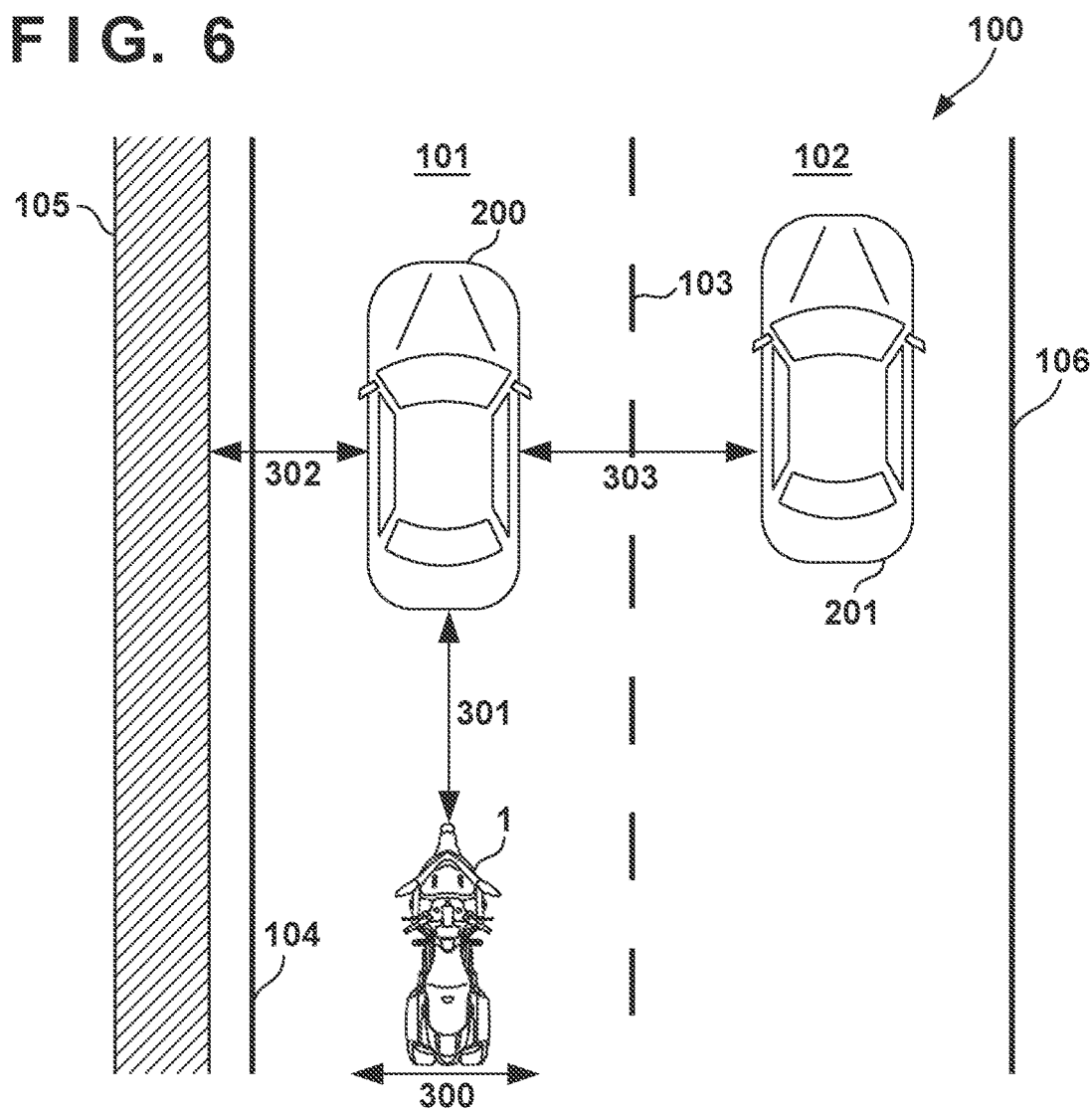
FIG. 6 is a view illustrating a positional relationship between the straddle type vehicle and an object in front thereof.

FIG. 6 is a view illustrating a positional relationship between the vehicle 1 and an object in front thereof. FIG. 6 illustrates a state in which the vehicle 1 is traveling in a left travel lane 101 on a road 100 having two lanes on one side. In addition, in the same travel lane 101 as the vehicle 1, a preceding vehicle 200 is traveling in front of the vehicle 1, and in a travel lane 102 adjacent to the travel lane 101, a vehicle 201 is traveling in front of the vehicle 1.

For example, the control apparatus 10 recognizes the presence of the preceding vehicle 200 and the vehicle 201 on the basis of the sensor values acquired in S1. In addition, for example, the control apparatus 10 recognizes a speed difference and an inter-vehicle distance 301 from the preceding vehicle 200, a travelable width 302 on the left side of the preceding vehicle 200, a travelable width 303 on the right side of the preceding vehicle 200, or the like on the basis of the sensor values acquired in S1. In the example of FIG. 6, the control apparatus 10 recognizes, as the travelable width 302, a distance in the width direction from preceding vehicle 200 to an area 105 such as a sidewalk bounded by a guard rail, a curb, or the like. Note that the control apparatus 10 may recognize, as the travelable width, a distance from the preceding vehicle 200 to a roadway outer line 104, which does not include a shoulder portion of the road 100. In addition, the control apparatus 10 recognizes a distance in the width direction from the preceding vehicle 200 to the vehicle 201 as the travelable width 303. Note that the control apparatus 10 may recognize, as the travelable width, a distance from the preceding vehicle 200 to a center line 106.

Note that the control apparatus 10 may execute the surrounding situation recognition of S2 using the detection result of the imaging unit 16A, may execute the surrounding situation recognition using the detection result of the radar 16B, or may execute the surrounding situation recognition using both of these detection results. In addition, the control apparatus 10 may perform the surrounding situation recognition of S2 on the basis of other information. For example, the speed information and the inter-vehicle distance 301 of the preceding vehicle 200 may be acquired by inter-vehicle communication or road-to-vehicle communication by the communication apparatus 18.

When there is a possibility of contact of the self-vehicle with an object in front in S3, the control apparatus 10 proceeds to S4, and ends the flowchart when there is no possibility of contact. For example, the control apparatus 10 checks whether the vehicle 1 and the preceding vehicle 200 can come into contact with each other within a predetermined period in a case where the current state continues on the basis of the inter-vehicle distance 301 and the speed difference between the vehicle 1 and the preceding vehicle 200. In the example of FIG. 6, when the speed of the vehicle 1 is higher than that of the preceding vehicle 200 and the vehicle 1 comes into contact with the preceding vehicle 200 within a predetermined period with the current speed difference, the control apparatus 10 determines that there is a possibility of contact. In the description below, it is assumed that FIG. 6 illustrates a state in which there is a possibility of contact between the vehicle 1 and the preceding vehicle 200.

Note that the surrounding situation recognition of S2 and the determination of possibility of contact of S3 may be performed using a detection result of the same detection device, or may be performed using detection results of different detection devices. For example, both determinations may be made using the detection results of the imaging unit 16A and the radar 16B, or the determination of S2 may be made using the detection result of the imaging unit 16A and the determination of S3 may be made using the detection result of the radar 16B.

In S4, the control apparatus 10 determines the presence or absence of an avoidance space for avoidance by turning. For example, the control apparatus 10 may determine the presence or absence of an avoidance space on the basis of the surrounding situation recognized in S2 and the information regarding the width direction of the vehicle 1. Specifically, the control apparatus 10 stores information of a necessary width 300 necessary for the vehicle 1 to pass in the storage device. Then, when the travelable width 302 or the travelable width 303 is larger than the necessary width 300, it is determined that there is an avoidance space for avoidance by turning.

In the example of FIG. 6, since the necessary width 300>the travelable width 302, the control apparatus 10 determines that there is no avoidance space on the left side of the preceding vehicle 200. On the other hand, since the necessary width 300<the travelable width 303, the control apparatus 10 determines that there is an avoidance space on the right side of the preceding vehicle 200. Note that the necessary width 300 may be a value obtained by adding a buffer to the width of the vehicle 1 itself. For example, the necessary width 300 may be a value 1.1 to 3 times the width of the vehicle 1 itself.

In S5, on the basis of the determination in S4, the control apparatus 10 proceeds to S6 when there is an avoidance space, and ends the flowchart when there is no avoidance space. In the example of FIG. 6, since there is an avoidance space on the right side of the preceding vehicle 200 as described above, the processing proceeds to S6.

In S6, the control apparatus 10 gives notification of the information regarding the avoidance space. In the present embodiment, the control apparatus 10 notifies the rider of the information regarding the avoidance space by displaying the information regarding the avoidance space in the notification area 505 of the meter panel 500. Thereafter, the flowchart is ended.

Figure 7:
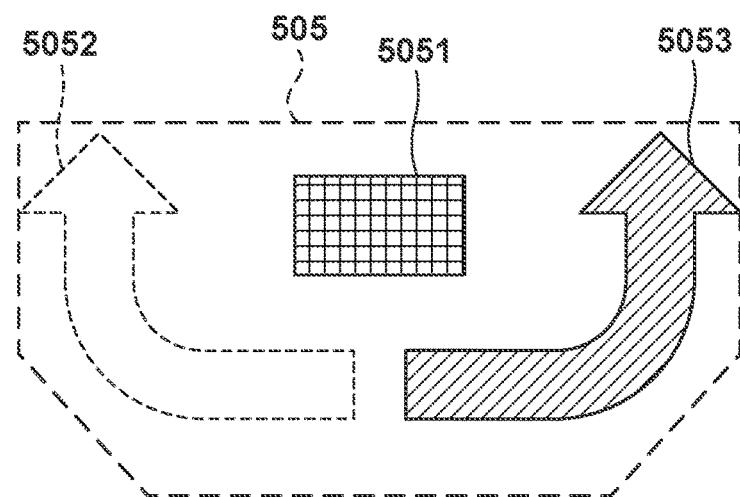
FIG. 7 is a view illustrating a configuration example of a notification area of a meter panel.

FIG. 7 is a view illustrating a configuration example of the notification area 505 of the meter panel 500. The notification area 505 is configured to be capable of displaying an object display image 5051 indicating that there is an object with which there is a possibility of contact in front of the vehicle 1, and direction display images 5052 and 5053 indicating directions in which there is an avoidance space by turning. In the case of the state illustrated in FIG. 6, since the preceding vehicle 200, which is an object with which there is a possibility of contact, exists in front of the vehicle 1 and there is an avoidance space on the right side of the preceding vehicle 200, the object display image 5051 and the direction display image 5053 indicating that there is an avoidance space on the right side are displayed in FIG. 7. On the other hand, since there is no avoidance space on the left side of the preceding vehicle 200, the direction display image 5052 indicating that there is an avoidance space on the left side is not displayed (displayed by the broken line for convenience in the drawing). Such display allows the rider to visually recognize that there is an object with which there is a possibility of contact in front, but can avoid it to the right by turning.

<Notification in Case where Avoidance is Possible on Both Left and Right Sides>

When it is determined in S4 of FIG. 5 that there is an avoidance space on both left and right sides of the preceding vehicle 200, the meter panel 500 may give notification of information regarding a direction in which the vehicle 1 can easily avoid contact with the preceding vehicle 200. For example, in S4, in a case where there is an avoidance space on both the left and right sides of the preceding vehicle 200, the control apparatus 10 may determine which one of the left and right sides is in a direction in which it is easy to avoid contact with the preceding vehicle 200. Then, the control apparatus 10 may display the direction display image 5052 or the direction display image 5053 corresponding to the direction in which avoidance is easy in the notification area 505.

The determination regarding the direction in which the contact with the preceding vehicle 200 is easily avoided may be made on the basis of, for example, the size of left and right travelable widths 322 and 323 of the preceding vehicle 200, a deviation between the center of the vehicle 1 in the width direction and the center of the preceding vehicle 200 in the width direction, other environmental parameters, and the like.

Figure 8:
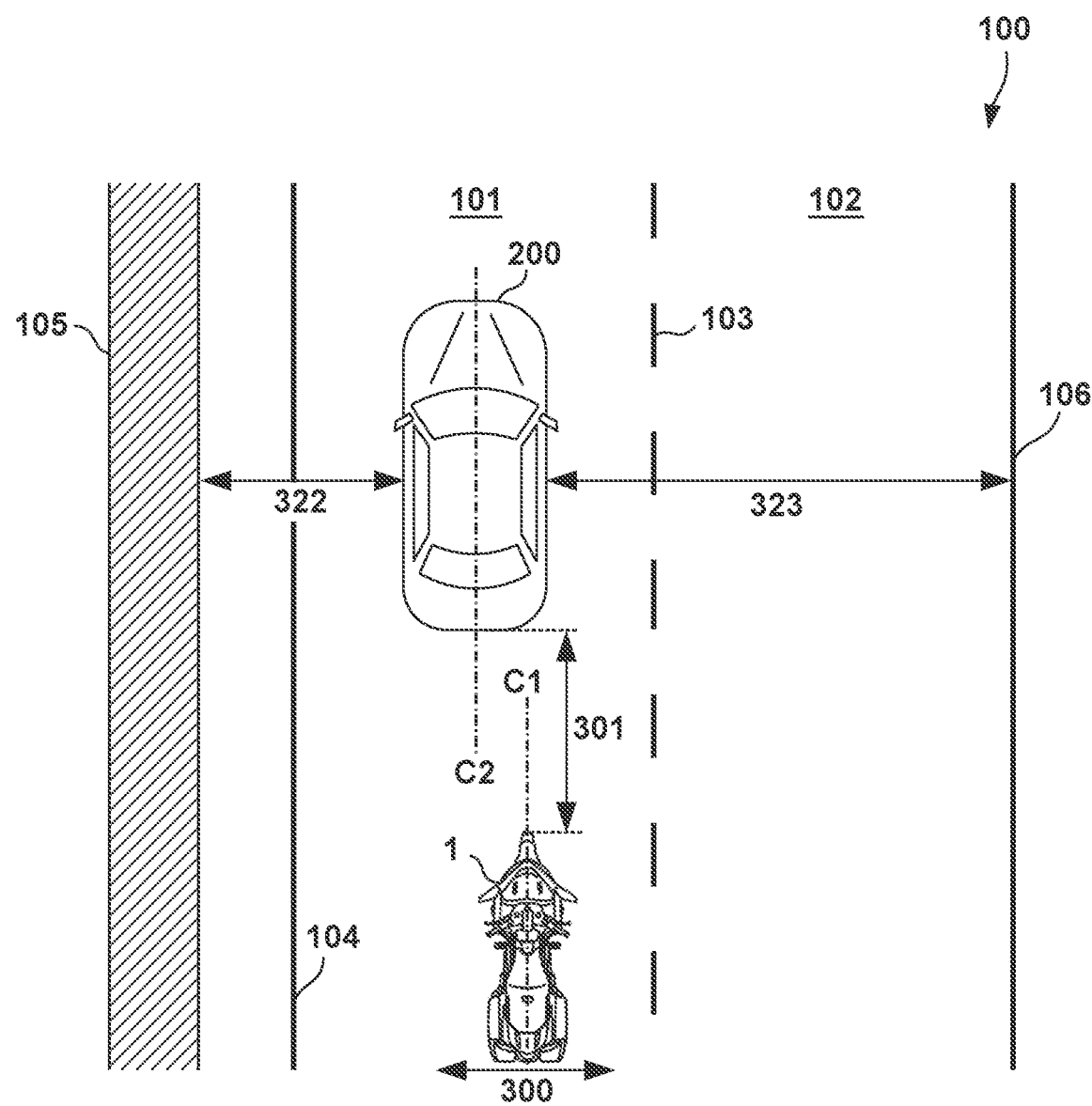
FIG. 8 is a view illustrating a positional relationship between the straddle type vehicle and an object in front thereof.

Here, FIG. 8 is a view illustrating a positional relationship between the vehicle 1 and an object in front thereof. In the example of FIG. 8, both the travelable width 322 on the left side of the preceding vehicle 200 and the travelable width 323 on the right side of the preceding vehicle 200 are larger than the necessary width 300 necessary for the vehicle 1 to pass. Accordingly, in such a case, since there is an avoidance space on both the left and right sides of the preceding vehicle 200, the control apparatus 10 determines which one of the left and right sides is in a direction in which it is easy to avoid contact with the preceding vehicle 200. In the example of FIG. 8, since the travelable width 323 is larger than the travelable width 322, the control apparatus 10 may determine that the right direction is the direction in which the avoidance is easy. In addition, a center line C1 of the vehicle 1 in the width direction is deviated in the right direction from a center line C2 of the preceding vehicle 200 in the width direction. Thus, when the vehicle 1 avoids contact with the preceding vehicle 200 in the right direction, the moving distance in the width direction is shorter, and thus the control apparatus 10 may determine that the right direction is the direction in which the avoidance is easy. In this manner, the control apparatus 10 may determine the direction in which avoidance is easy on the basis of the position of the preceding vehicle 200, the relative positional relationship between the vehicle 1 and the preceding vehicle 200, and the like.

In addition, in a case where an oncoming lane or an adjacent overtaking lane is provided on either the left or right of the vehicle 1, the control apparatus 10 may determine that a direction in which they are not provided is a direction in which the avoidance is easy and display the notification in the notification area 505. In the example of FIG. 8, the control apparatus 10 may determine that the avoidance is easy in the direction of the left side of the preceding vehicle 200 instead of the right side of the preceding vehicle 200 on which the travel lane 102, which is an overtaking lane, is provided.

In addition, as another determination factor, the control apparatus 10 may determine a direction in which the avoidance is easy on the basis of a road surface condition or an environmental parameter such as the width of the travel lane 101 in which the vehicle is currently traveling. Examples of the road surface condition include a condition regarding the presence or absence of fallen leaves, icy road, or a wet portion. For example, the control apparatus 10 may acquire the environmental parameters on the basis of the detection result of the imaging unit 16A, or may receive the information regarding the environmental parameters with the communication apparatus 18.

Note that, as a mode of notification of the information regarding the direction in which the avoidance is easy, it is also possible to adopt a mode in which both the direction display image 5052 and the direction display image 5053 are displayed and one of them is emphasized, instead of displaying only the direction display image corresponding to the direction in which the avoidance is easy. For example, the control apparatus 10 may display the direction display image in the direction in which the avoidance is easy larger or change the color of the direction display image in the direction in which the avoidance is easy.

As described above, since the information notification of which is given by the control apparatus 10 includes the information regarding the direction in which the vehicle 1 can easily avoid contact with the preceding vehicle 200, the rider can grasp on which of the left and right sides the avoidance is easy.

Note that it is also possible to adopt a configuration in which the right and left direction display image 5052 and direction display image 5053 are simply displayed in a case where the avoidance is possible on both the right and left sides.

<Example of Information Regarding Avoidance Space>

Figure 9:
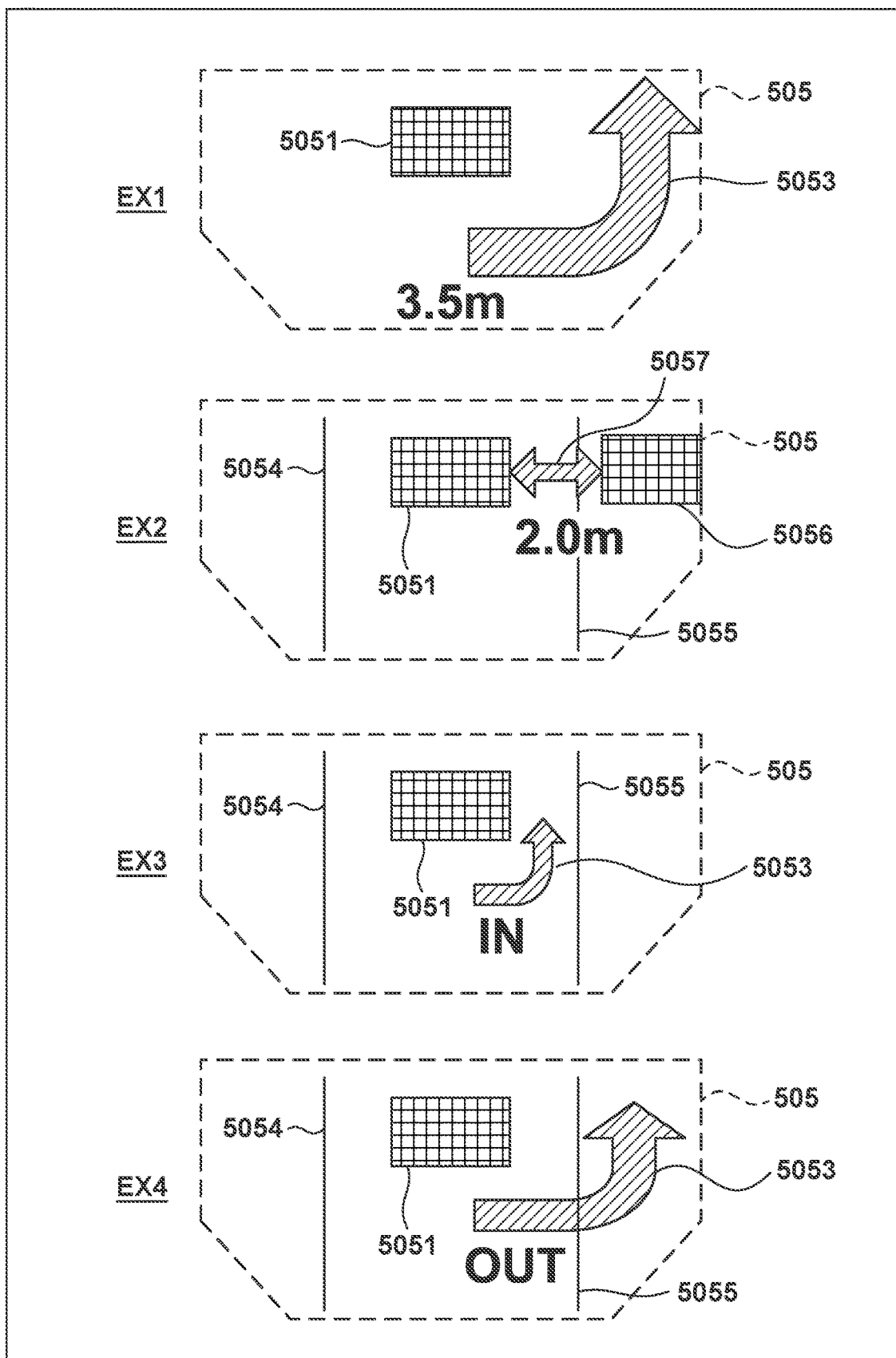
FIG. 9 is a view illustrating display examples of a notification area of a meter panel.

The content of the information notification of which is given to the rider by the meter panel 500 in S6 can be appropriately set. FIG. 9 is a view illustrating display examples of the notification area 505 of the meter panel 500. Note that the display configurations exemplified below can be appropriately combined.

In a display example EX1, the width of the avoidance space is displayed as a numerical value as an example of a case where notification of the information regarding the width of the avoidance space is given. In the case of the display example EX1, it is indicated that there is an avoidance space of 3.5 m on the right side of the object in front. Hence, the rider can recognize the width of the avoidance space as a specific numerical value. Note that in a case where the avoidance space is sufficiently secured, for example, 7.0 m or more may be displayed. With the display of "○○ m or more", the rider can intuitively recognize that the avoidance space is sufficient.

In a display example EX2, another example of giving notification of information regarding the width of the avoidance space is illustrated. In the display example EX2, lane display images 5054 and 5055 indicating both ends of the travel lane 101 of the vehicle 1 and an object display image 5056 indicating the presence of the vehicle 201 traveling in the travel lane 102 adjacent to the travel lane 101 of the vehicle 1 are illustrated. Then, the width of the avoidance space is indicated together with a vehicle spacing display image 5057 between the object display image 5051 and the object display image 5056.

In addition, in addition to specific numerical values, information regarding the width of the avoidance space may be indicated by changing the display mode of the direction display image 5053 or the vehicle spacing display image 5057. For example, the color of the direction display image 5053 or the vehicle spacing display image 5057 may be changed such that blue is used in a case where the avoidance space is sufficiently secured (for example, 7.0 m or more), yellow is used in a case where the avoidance space is medium (for example, 2.0 m or more and less than 7.0 m), and amber (orange) is used in a case where there is a space where the avoidance is possible but the space is small (for example, less than 2.0 m). Hence, even when the rider does not grasp the width of the vehicle 1, the width necessary for avoidance including the buffer, and the like, it is possible to recognize the ease of avoidance.

Note that the numerical values described above are exemplary and can be set as appropriate. In addition, it is also possible to adopt a configuration in which the size of the direction display image 5053 or the vehicle spacing display image 5057 changes according to the width of the avoidance space or a configuration in which the pattern changes. Furthermore, the above-described configurations may be appropriately combined.

In a display example EX3, an example in which notification of information regarding whether contact with an object can be avoided in the travel lane 101 in which the vehicle 1 is traveling is given is indicated. In the case of the display example EX3, it is indicated that there is an avoidance space where avoidance of contact with the object in front is possible in the travel lane on the right side of the object in front. In the display example EX3, characters "IN" are displayed as information indicating that contact with an object can be avoided in the travel lane 101 in which the vehicle 1 is traveling. In addition, the direction display image 5053 is displayed so as to be fit within the lane display images 5054 and 5055 indicating both ends of the travel lane 101 of the vehicle 1. Such a display allows the rider to recognize that the object in front can be avoided without lane changing.

In a display example EX4, a display example is indicated in a case where contact with an object is not possible in the travel lane 101 in which the vehicle 1 is traveling, that is, a case where the vehicle 1 will straddle the adjacent lane at the time of avoiding contact. Specifically, characters "OUT" are displayed in the notification area 505, and the direction display image 5053 is displayed to cross the lane display image 5055.

Figure 10:
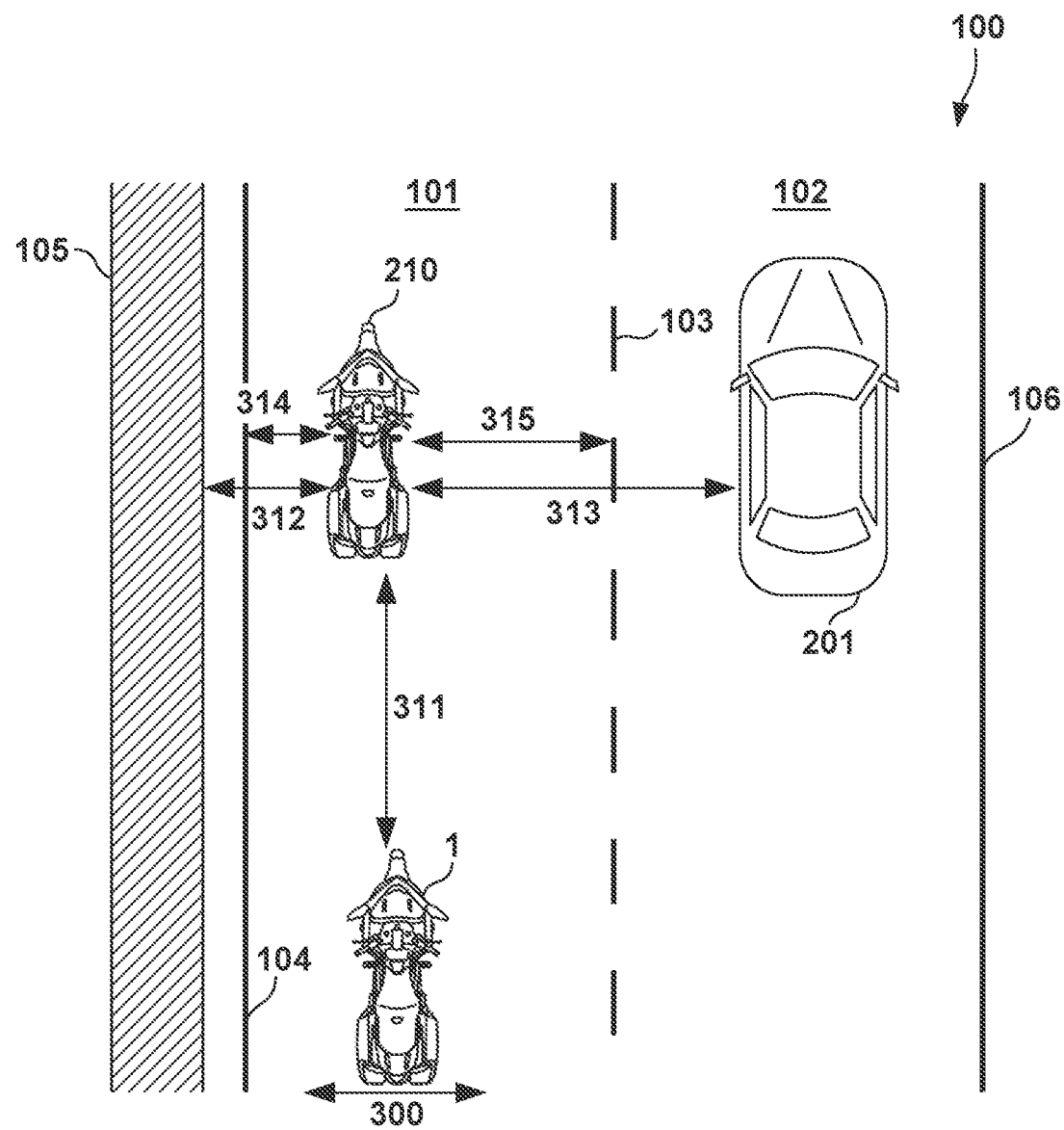
FIG. 10 is a view illustrating a positional relationship between the straddle type vehicle and an object in front thereof.

Here, FIG. 10 is a view illustrating a positional relationship between the vehicle 1 and an object in front thereof. In FIG. 10, a preceding vehicle 210 is a straddle type vehicle, and the space on the right side of the preceding vehicle 210 is particularly large.

For example, in S2 of FIG. 5, the control apparatus 10 acquires values of an in-lane travelable width 314, which is a width from the preceding vehicle 200 to the roadway outer line 104, and an in-lane travelable width 315, which is a width from the preceding vehicle 200 to a lane boundary line 103, in addition to travelable widths 312 and 313. In the example of FIG. 10, since the necessary width 300<the in-lane travelable width 315, the control apparatus 10 displays an image like the display example EX3 in the notification area 505 in S6.

As described above, according to the present embodiment, when there is a possibility of contact with an object in front, the rider is notified of the information regarding the avoidance space. Accordingly, the rider can be notified of the information for avoidance by turning.

Second Embodiment

The second embodiment is different from the first embodiment in that notification of information regarding an avoidance space is given at a timing at which the vehicle 1 can avoid contact with the preceding vehicle 200. Hereinafter, the same configurations as those in the first embodiment are denoted by similar reference numerals, and description thereof will be omitted.

Figure 11:
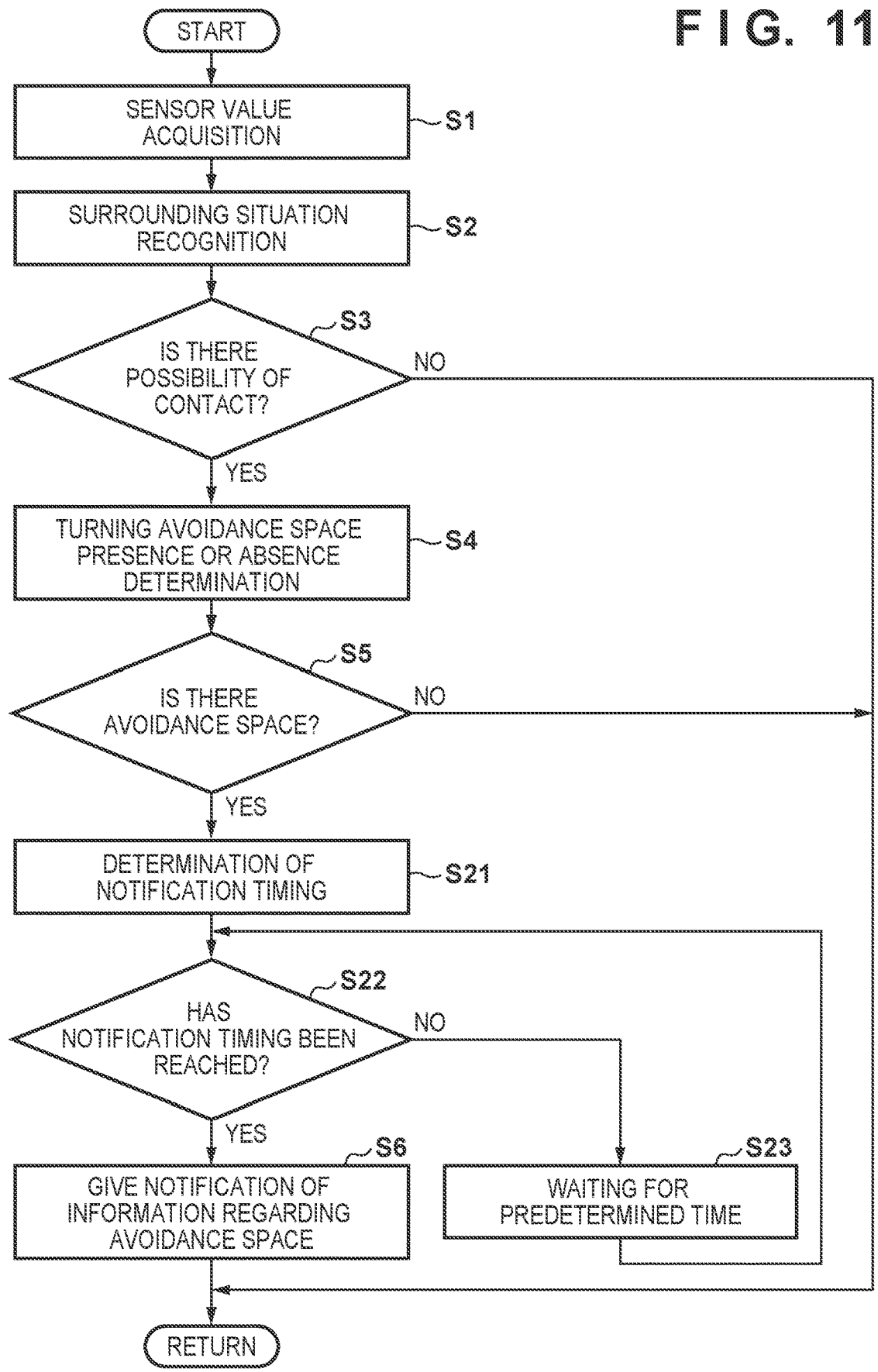
FIG. 11 is a flowchart regarding processing of notification for avoiding contact with an object in front executed by a control apparatus.

FIG. 11 is a flowchart regarding processing of notification for avoiding contact with an object in front executed by the control apparatus 10. S1 to S6 are the same as those in the flowchart of FIG. 5, and thus description thereof is omitted.

When the processing proceeds to Yes on the branch of S5, the control apparatus 10 executes determination of the notification timing in S21. Then, in S22, when the notification timing has been reached, the control apparatus 10 proceeds to S6 and causes the meter panel 500 to give notification of the information regarding the avoidance space, and when the notification timing has not been reached, the control apparatus 10 proceeds to S23, waits for a predetermined time, and then returns to S22. Note that after waiting for a predetermined time, the processing may return to S21 to determine the notification timing again.

The determination of the notification timing may be performed, for example, on the basis of whether it is a timing at which the vehicle 1 can avoid contact with the preceding vehicle 200. For example, the control apparatus 10 may control the notification timing so that the notification is displayed in the notification area 505 at the timing when the vehicle 1 can avoid contact with the preceding vehicle 200. Alternatively, the control apparatus 10 may estimate the timing at which the vehicle 1 can avoid contact with the preceding vehicle 200 and control the notification timing so that the notification is displayed in the notification area 505 a predetermined time before the estimated timing. Hence, since the rider can recognize the information of the avoidance space at the timing at which the avoidance is possible, the avoidance action by turning can be started immediately.

The determination as to whether it is a timing at which the contact with the preceding vehicle 200 can be avoided may be performed on the basis of, for example, information regarding the possibility of avoiding the contact of the vehicle 1 with the preceding vehicle 200. Specifically, it may be determined whether it is a timing at which the avoidance is possible on the basis of the relationship between the vehicle 1 and the preceding vehicle 200, the situation of the vehicle 1, environmental parameters, parameters such as the traveling skill of the rider, and the like.

Examples of the relationship between the vehicle 1 and the preceding vehicle 200 used for determining whether it is a timing at which contact with the preceding vehicle 200 can be avoided include the inter-vehicle distance 301, the speed difference between the vehicle 1 and the preceding vehicle 200, the amount of deviation between the center positions of the vehicle 1 and the preceding vehicle 200 in the width direction, and the like.

For example, when the inter-vehicle distance 301 or the speed difference between the vehicle 1 and the preceding vehicle 200 is within an allowable range, the control apparatus 10 may determine that it is a timing at which contact with the preceding vehicle 200 can be avoided by turning. In addition, since the amount movement of the vehicle 1 in the width direction varies depending on the deviation between the center positions of the vehicle 1 and the preceding vehicle 200 in the width direction, the time required to move to the avoidance space may change. Thus, the control apparatus 10 may determine whether it is a timing at which the avoidance is possible on the basis of the deviation between the center positions of the vehicle 1 and the preceding vehicle 200 in the width direction.

In addition, examples of the situation of the vehicle 1 used for determining whether it is a timing at which contact with the preceding vehicle 200 can be avoided include whether it is a vehicle speed at which a turning action is possible, whether the acceleration and the tilting of the vehicle body are within an allowable range, and the like.

In addition, examples of the environmental parameters used for determining whether it is a timing at which contact with the preceding vehicle 200 can be avoided include a road surface condition, the width and tilting of the travel lane 101 in which the vehicle is currently traveling, and a condition as to whether the front is straight. Examples of the road surface condition include the presence or absence of fallen leaves, icy road, or a wet portion.

For example, in a case where there is a slippery area due to fallen leaves, icy road, or the like ahead as the road surface condition, it is conceivable that the avoidance action by turning is more easily executed after passing through this slippery area. Accordingly, in a case where there is a slippery area ahead, the control apparatus 10 may determine that it is not the timing at which the avoidance is possible until passing through the area. However, even when there is a slippery area ahead, the control apparatus 10 may determine that it is the timing at which the avoidance is possible in a case where the avoidance action by turning can be completed before reaching the area.

In addition, in a case where the tilting of the travel lane 101 (for example, the tilting in the roll direction) is large, or in a case where the front is not straight but curved, or the like, it may be difficult to perform the turning action itself. Accordingly, in a case where the tilting of the travel lane 101 or the degree of straightness of the travel lane 101 ahead is not within the allowable range, the control apparatus 10 may determine that it is not the timing at which the avoidance is possible.

Note that, for example, the control apparatus 10 may acquire the environmental parameters on the basis of the detection result of the imaging unit 16A, or may receive the information regarding the environmental parameters with the communication apparatus 18.

In addition, examples of the parameters of the traveling skill of the rider used for determining whether it is a timing at which contact with the preceding vehicle 200 can be avoided include the stability of the vehicle during straight traveling or turning, the frequency of sudden acceleration, sudden braking, and the like. For example, the vehicle 1 may include an inertial measurement unit (IMU), and the control apparatus 10 may evaluate the driving skill of the rider as described above on the basis of output data of the IMU at the time of traveling and store the evaluation result in the storage device. Then, for example, the control apparatus 10 may control the notification timing so that the notification timing is earlier for a rider with low driving skill than for a rider with no low driving skill.

In addition, the control apparatus 10 may determine whether it is a timing at which contact with the preceding vehicle 200 can be avoided on the basis of the behavior of the preceding vehicle 200. For example, the control apparatus 10 may acquire the position, the moving speed, and the like of the preceding vehicle 200 in the width direction on the basis of the detection result of the detection unit 16. Then, in a case where the preceding vehicle 200 is moving in the width direction, the control apparatus 10 may estimate an avoidance space when passing by a lateral side of the preceding vehicle 200 and determine the timing at which the avoidance is possible on the basis of the estimation result. For example, when the preceding vehicle 200 is moving in the direction of reducing the avoidance space, the control apparatus 10 may determine to postpone the timing at which the avoidance is possible. Note that, even when it is determined that there is an avoidance space on the lateral side of the preceding vehicle 200 at present, it is conceivable that the preceding vehicle 200 is moving in the width direction and it is estimated that the avoidance space is not sufficiently secured at the time point when the vehicle 1 passes by the lateral side of the preceding vehicle 200. In such a case, the control apparatus 10 may suppress the notification.

The control apparatus 10 may control the notification timing on the basis of the behavior of a following vehicle. For example, in a case where the avoidance space straddles the adjacent lane, when the distance between the vehicle 1 and the following vehicle traveling in the adjacent lane is short, or when the speed of the following vehicle is higher than the speed of the vehicle 1, it is conceivable that the vehicle 1 comes into contact with the following vehicle when entering the adjacent lane. Thus, even in a situation where the contact with the preceding vehicle 200 can be avoided in relation to the preceding vehicle 200, the control apparatus 10 may suppress the notification using the notification area 505 when the distance or the speed difference with the following vehicle is not within the allowable range. Note that the control apparatus 10 may acquire a distance, a speed difference, and the like from the following vehicle on the basis of the detection result of the imaging unit 20A or the radar 20B.

As described above, according to the present embodiment, notification of the information regarding the avoidance space is given to the rider at a timing when the rider can execute the turning action for avoiding the contact with the preceding vehicle 200. Accordingly, the rider can execute the avoidance by turning at a more appropriate timing.

Third Embodiment

The third embodiment is different from the first embodiment or the second embodiment in that traveling assistance of the turning action is performed at a timing at which a vehicle can avoid contact with a preceding vehicle. Hereinafter, the same configurations as those in the first embodiment or second embodiment are denoted by similar reference numerals, and description thereof will be omitted.

Figure 12:
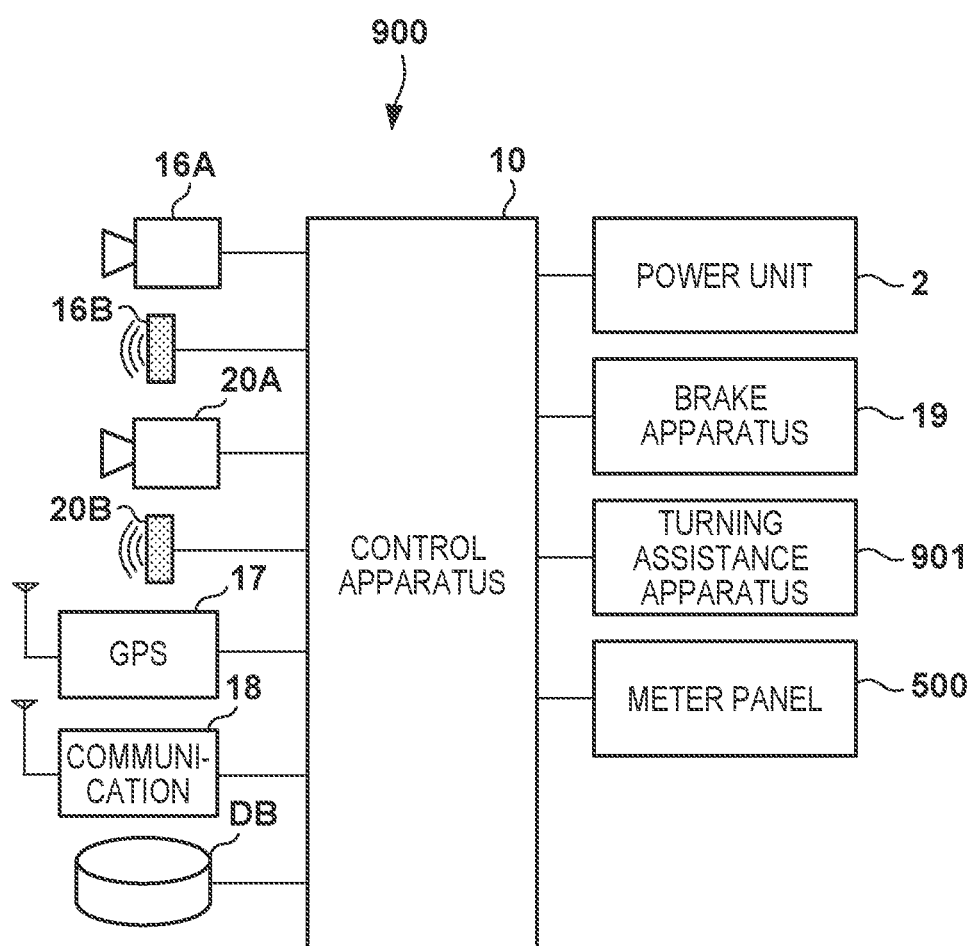
FIG. 12 is a block diagram illustrating a configuration example of hardware of the straddle type vehicle.

FIG. 12 is a block diagram illustrating a configuration example of hardware of a vehicle 900, and mainly illustrates a necessary configuration in relation to the description to be described below. In the present embodiment, the vehicle 900 includes a turning assistance apparatus 901 that assists the turning action by the rider. The turning assistance apparatus 901 includes, for example, an actuator such as a motor for generating steering torque of the vehicle 1. For example, the control apparatus 10 controls the steering torque generated by the turning assistance apparatus 901 such that the steering shaft has a predetermined steering angle.

In addition, the control apparatus 10 controls the operations of the power unit 2 and a brake 19. The control apparatus 10 recognizes the surrounding situation of the vehicle 900 on the basis of the detection result of the detection unit 16 and the like, and controls the power unit 2, the brake 19, or the turning assistance apparatus 901 on the basis of the recognition result, thereby enabling traveling assistance for the rider.

Figure 13:
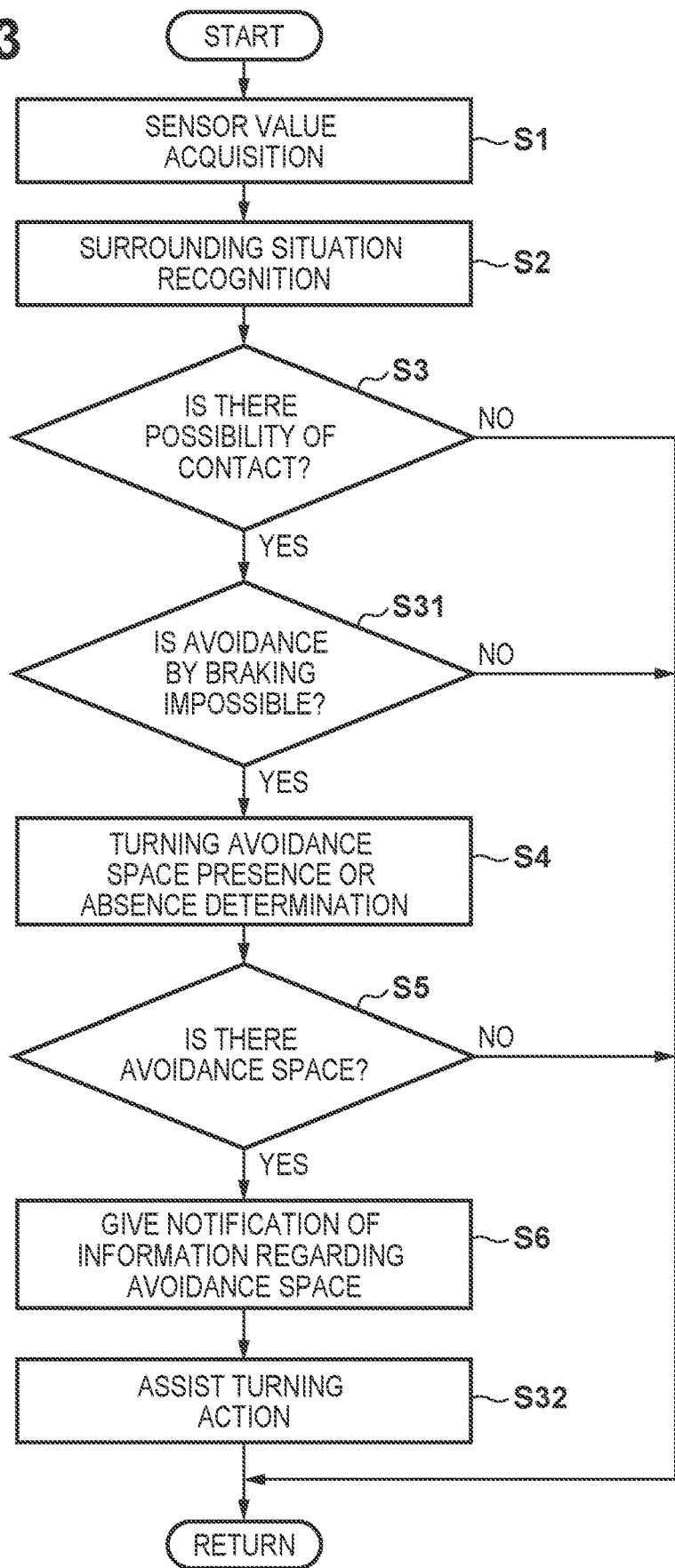
FIG. 13 is a flowchart regarding processing of notification for avoiding contact with an object in front executed by a control apparatus.

FIG. 13 is a flowchart regarding processing of notification for avoiding contact with an object in front executed by the control apparatus 10. S1 to S6 are the same as those in the flowchart of FIG. 5, and thus description thereof is omitted.

When the processing proceeds to Yes in S3, the control apparatus 10 determines whether the avoidance by braking is impossible in S31, and when it is impossible, the processing proceeds to S4, and when it is possible, the flowchart ends.

In addition, when the processing proceeds to Yes in S5, the control apparatus 10 causes the meter panel 500 to give notification of the information regarding the avoidance space in S6, and the turning assistance apparatus 901 assists the turning action in S32. Hence, avoidance by turning to the avoidance space can be automatically performed. Note that the control apparatus 10 may execute not only steering control by the turning assistance apparatus 901 but also acceleration/deceleration control by the power unit 2 or the brake 19.

Other Embodiments

In the description of the above embodiments, the aspect has been described in which the avoidance is performed in the avoidance space in a case where the preceding vehicle can be avoided by turning, but the notification may be stopped in a case where turning avoidance cannot be executed after turning avoidance becomes possible once. For example, the control apparatus 10 may stop the display in the notification area 505 in a case where it is determined that the turning avoidance is not possible due to a change in the distance or the speed difference from the preceding vehicle after determining that the turning avoidance is possible and notification regarding the avoidance space is given.

Note that the configuration of the notification area 505 is an example, and the display images may be appropriately changed or omitted. For example, the direction display images 5052 and 5053 may be other symbols or characters instead of arrows.

In the description of the above embodiments, the preceding vehicle 200 has been described as an example of the object in front of the vehicle, but the object to be avoided is not limited thereto, and may be an obstacle such as a fallen object, a person crossing the road 100, or the like.

In addition, for example, in a case where the object in front can be avoided by the braking action, the notification regarding the avoidance space may be suppressed. For example, even when it is determined in S4 that there is an avoidance space, when the inter-vehicle distance 301 sufficient for performing avoidance by braking is secured, the control apparatus 10 may suppress notification regarding the avoidance space. In addition, for example, in such a case, the control apparatus 10 may cause the meter panel 500 to display the notification prompting avoidance of contact with the preceding vehicle 200 by braking. Alternatively, the control apparatus 10 may cause the meter panel 500 to display that contact with the preceding vehicle 200 can be avoided by both braking and turning.

Summary of Embodiment

The embodiment discloses at least the following straddle vehicle, control method thereof, control apparatus and program.

1. The straddle type vehicle (1) of the above embodiment comprises:
   a front detection unit (16A) configured to detect an object in front of a self-vehicle;
   a first determination unit (10, S4) configured to determine whether there is an avoidance space for avoiding contact with the object by turning in a case where there is a possibility of contact of the self-vehicle with the object; and a notification unit (500) configured to give notification of information regarding the avoidance space in a case where the first determination unit determines that there is the avoidance space According to the embodiment, when there is a possibility of contact with an object in front, the rider is notified of the information regarding the avoidance space. Accordingly, the rider can be notified of the information for avoidance by turning.

2. In the embodiment, the information regarding the avoidance space includes information regarding a width of the avoidance space.

According to the embodiment, since notification of the information regarding the width of the avoidance space is given to the rider, the rider can recognize the ease of avoidance by turning.

3. In the embodiment, the information regarding the avoidance space includes information regarding whether it is possible to avoid contact with the object in a travel lane in which the self-vehicle is traveling.

According to the embodiment, the rider can recognize whether it is possible to avoid contact with an object in front without lane changing.

4. In the embodiment, the information regarding the avoidance space includes information regarding a direction in which avoidance is easy in a case where the avoidance space exists on both left and right sides of the object.

According to the embodiment, it is possible to prompt the rider to turn in a direction in which the avoidance is easy.

5. The embodiment further comprises a second determination unit (10, S21) configured to determine a timing of notification by the notification unit on a basis of information regarding a possibility of avoidance of contact of the self-vehicle with the object in a case where the first determination unit determines that there is the avoidance space.

According to the embodiments, the rider can recognize the avoidance space at the timing at which the avoidance is possible.

6. In the embodiment, the object is a preceding vehicle, and
   the second determination unit determines the timing on a basis of a behavior of the preceding vehicle in a width direction.

According to the embodiment, the rider can recognize the timing at which the avoidance is possible on the basis of the behavior of the preceding vehicle.

7. The embodiment further comprises a suppression unit configured to suppress notification by the notification unit when it is estimated that the avoidance space is not secured at a time point when the self-vehicle passes by a lateral side of the object due to a behavior of the object in a width direction even in a case where the first determination unit determines that there is the avoidance space.

According to the embodiment, it is possible to suppress the notification when the avoidance space cannot be secured according to the behavior of the object in front.

8. The embodiment further comprises a rear detection unit configured to detect a vehicle behind the self-vehicle,
   wherein
   the second determination unit determines the timing so as to suppress notification of information regarding the avoidance space on a basis of a detection result of the rear detection unit.

According to the embodiment, since the notification is suppressed according to the behavior of the following vehicle, it is possible to prompt the rider to perform turning avoidance based on the behavior of the following vehicle.

9. In the embodiment, the notification unit gives notification by displaying information regarding the avoidance space on a meter panel (500) of the self-vehicle.

According to the embodiment, the rider can visually recognize the information of the avoidance space.

10. The embodiment further comprises an assistance unit (901) configured to assist a turning action of the self-vehicle,
    wherein
    the assistance unit assists the turning action to avoid contact with the object in a case where the contact with the object cannot be avoided by braking and can be avoided by turning.

According to the embodiment, when contact with an object in front cannot be avoided by braking, avoidance by turning can be assisted.

11. The control method of the embodiment, for a straddle type vehicle, comprises:
    a front detection step (S1) of detecting an object in front of a self-vehicle;
    a determination step (S4) of determining whether there is an avoidance space for avoiding contact with the object by turning in a case where there is a possibility of contact of the self-vehicle with the object; and a notification step (S6) of giving notification of information regarding the avoidance space in a case where it is determined that there is the avoidance space in the determination process.

According to the embodiment, it is possible to notify the rider of information for avoidance by turning.

12. The control apparatus (10) of the embodiment, for a straddle type vehicle (1) including front a detection unit (16A) configured to detect an object in front of a self-vehicle, comprises:
a first determination unit (S4) configured to determine whether there is an avoidance space for avoiding contact with the object by turning in a case where there is a possibility of contact of the self-vehicle with the object; and
a notification control unit (S6) configured to notify notification unit (500) of the straddle type vehicle of information regarding the avoidance space in a case where the first determination unit determines that there is the avoidance space.

According to the embodiment, it is possible to notify the rider of information for avoidance by turning.

13. The program of the embodiment, causes a computer to function as each unit of the control apparatus according to the item 12.

According to the embodiments, it is possible to notify the rider of information for avoidance by turning.

The invention is not limited to the foregoing embodiments, and various variations/changes are possible within the spirit of the invention.

What is claimed is:

1. A straddle type vehicle comprising:
a front detection unit configured to detect an object in front of a self-vehicle;
a first determination unit configured to determine whether there is an avoidance space on a left side or right side of the object for avoiding contact with the object by turning in a case where there is a possibility of contact of the self-vehicle with the object and an avoidance of the contact of the self-vehicle with the object by braking is impossible; and
a notification unit configured to give notification of information regarding the avoidance space in a case where the first determination unit determines that there is the avoidance space,
wherein the notification unit gives notification of information, as the information regarding the avoidance space, indicating that the avoidance space is on a left side or right side of the object and that it is possible to avoid contact with the object by turning in a travel lane in which the self-vehicle is traveling.

2. The straddle type vehicle according to claim 1, wherein the information regarding the avoidance space includes information regarding a width of the avoidance space.

3. The straddle type vehicle according to claim 1, wherein the information regarding the avoidance space includes information regarding a direction in which avoidance is easy in a case where the avoidance space exists on both left and right sides of the object.

4. A straddle type vehicle comprising:
a front detection unit configured to detect an object in front of a self-vehicle;
a first determination unit configured to determine whether there is an avoidance space for avoiding contact with the object by turning in a case where there is a possibility of contact of the self-vehicle with the object;

a notification unit configured to give notification of information regarding the avoidance space in a case where the first determination unit determines that there is the avoidance space; and
a second determination unit configured to determine a timing of notification by the notification unit on a basis of information regarding a possibility of avoidance of contact of the self-vehicle with the object in a case where the first determination unit determines that there is the avoidance space,
wherein the notification unit gives notification of information, as the information regarding the avoidance space, indicating that it is possible to avoid contact with the object by turning in a travel lane in which the self-vehicle is traveling, and
wherein the second determination unit determines the timing of notification based on:
a situation of the self-vehicle;
an environment parameter; and/or
a parameter regarding a traveling skill of a rider.

5. The straddle type vehicle according to claim 4, wherein the object is a preceding vehicle, and
the second determination unit determines the timing on a basis of a behavior of the preceding vehicle in a width direction.

6. The straddle type vehicle according to claim 4, further comprising:
a rear detection unit configured to detect a vehicle behind the self-vehicle,
wherein
the second determination unit determines the timing so as to suppress notification of information regarding the avoidance space on a basis of a detection result of the rear detection unit.

7. The straddle type vehicle according to claim 4, wherein the situation of the self-vehicle includes:
whether it is a vehicle speed at which a turning action is possible; and/or
whether an acceleration of the self-vehicle and a tilting of a vehicle body are within an allowable range.

8. The straddle type vehicle according to claim 4, wherein the environment parameter includes:
a road surface condition in which the self-vehicle is traveling;
a width and tilting of a travel lane in which the self-vehicle is traveling; and/or
whether a road in front of the self-vehicle is straight or not.

9. The straddle type vehicle according to claim 4, wherein the parameter regarding the traveling skill of the rider includes:
a stability of the self-vehicle during straight traveling or turning; and/or
a frequency of sudden acceleration or sudden braking.

10. The straddle type vehicle according to claim 1, further comprising:
a suppression unit configured to suppress notification by the notification unit when it is estimated that the avoidance space is not secured at a time point when the self-vehicle passes by a lateral side of the object due to a behavior of the object in a width direction even in a case where the first determination unit determines that there is the avoidance space.

11. The straddle type vehicle according to claim 1, wherein the notification unit gives notification by displaying information regarding the avoidance space on a meter panel of the self-vehicle.

12. The straddle type vehicle according to claim 1, further comprising:
- an assistance unit configured to assist a turning action of the self-vehicle,
- wherein
- the assistance unit assists the turning action to avoid contact with the object in a case where the contact with the object cannot be avoided by braking and can be avoided by turning.

13. A control method for a straddle type vehicle, comprising:
- a front detection step of detecting an object in front of a self-vehicle;
- a determination step of determining whether there is an avoidance space on a left side or right side of the object for avoiding contact with the object by turning in a case where there is a possibility of contact of the self-vehicle with the object and an avoidance of the contact of the self-vehicle with the object by braking is impossible; and
- a notification step of giving notification of information regarding the avoidance space in a case where it is determined that there is the avoidance space in the determination process,
- wherein in the notification step, notification of information, as the information regarding the avoidance space, indicating the avoidance space is on a left side or right side of the object and that that it is possible to avoid contact with the object by turning in a travel lane in which the self-vehicle is traveling is given.

14. A non-transitory computer-readable storage medium storing a program for causing a computer to execute each step of the control method according to claim 13.

* * * * *